Dec. 8, 1959   W. L. STEPHENSON   2,916,705
ELECTRIC CIRCUIT ARRANGEMENT FOR GENERATING
SUBSTANTIALLY LINEAR VOLTAGE CHANGES
Filed May 22, 1956   2 Sheets-Sheet 1

INVENTOR
WILLIAM LAWRENCE STEPHENSON
BY
AGENT

INVENTOR
WILLIAM LAWRENCE STEPHENSON
BY
AGENT

United States Patent Office 2,916,705
Patented Dec. 8, 1959

2,916,705

ELECTRIC CIRCUIT ARRANGEMENT FOR GENERATING SUBSTANTIALLY LINEAR VOLTAGE CHANGES

William Lawrence Stephenson, Harley, Surrey, England, assignor, by mesne assignments, to North American Philips Company, Inc., New York, N.Y., a corporation of Delaware Application May 22, 1956, Serial No. 586,503

Claims priority, application Great Britain May 31, 1955

8 Claims. (Cl. 331—111)

This invention relates to electric circuit arrangements for generating substantially linear voltage changes, and it is an object of the invention to provide an improved circuit arrangement employing transistors.

According to the invention, a circuit arrangement essentially comprises a first transistor provided with a negative feed-back loop comprising a capacitance connected between its collector circuit and its base electrode and a second and a third transistor the electrodes of which are coupled together so as to form a regenerative feed-back loop capable of bringing about substantial interruption of the emitter-collector circuit of the second transistor, said circuit being connected in the collector circuit of the first transistor for effectively interrupting said negative feed-back loop.

In such arrangements the negative feedback loop provides for substantially linear voltage changes at the collector of the first or of the second transistor.

Preferably the trigger loop or regenerative feedback loop includes a coupling consisting of a direct connection from the collector of said third transistor to the base of said second transistor and a coupling providing a D.C. path between the emitters of the said two transistors. With such connections the loop may form with the second and third transistors a bistable, monostable or astable circuit as described in pending United States patent application Serial No. 564,067, filed February 7, 1956.

Other methods of causing monostable or astable operation will be described hereinafter.

Specific embodiments of the invention will now be described by way of example with reference to the accompanying diagrammatic drawing in which:

Figure 1 is the diagram of a circuit arrangement while

Figure 1:
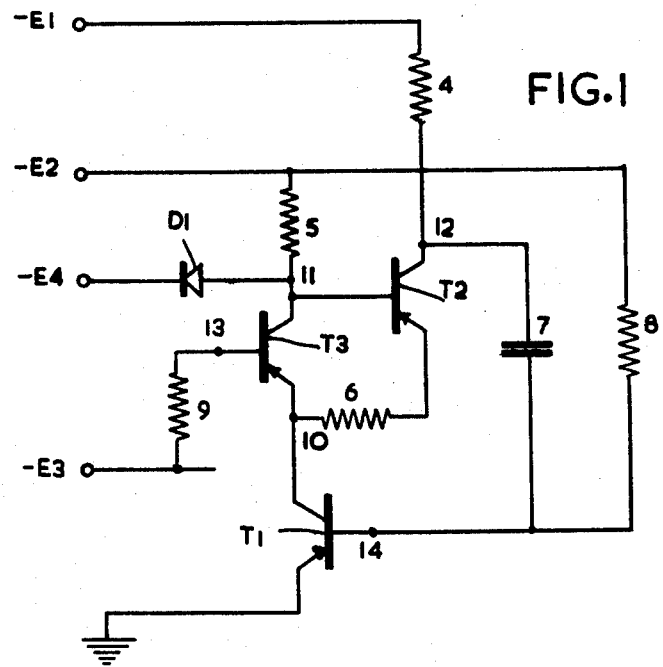
Figure 2:
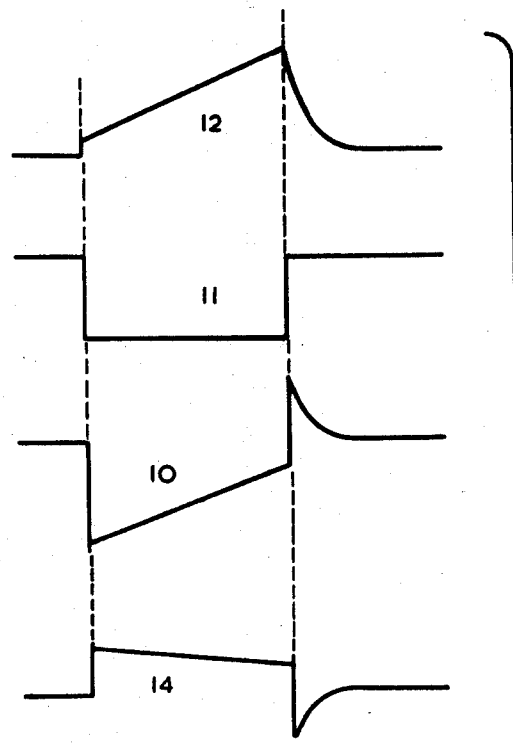
Figure 2 is a graph of voltage waveforms obtained from points 12, 11, 10 and 14 indicated in the diagram of Figure 1.
Figure 3:
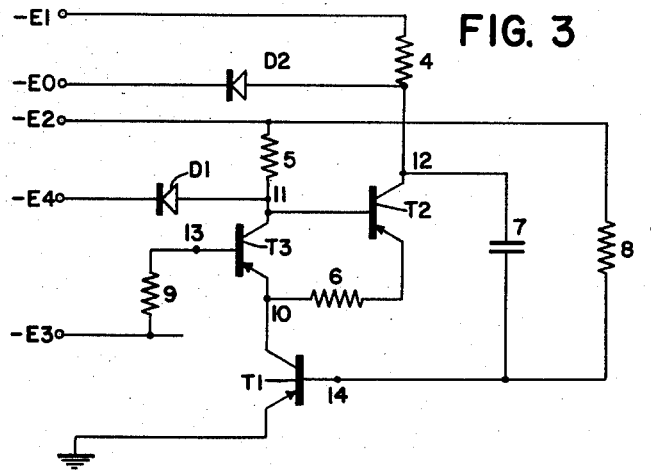
Figure 4:
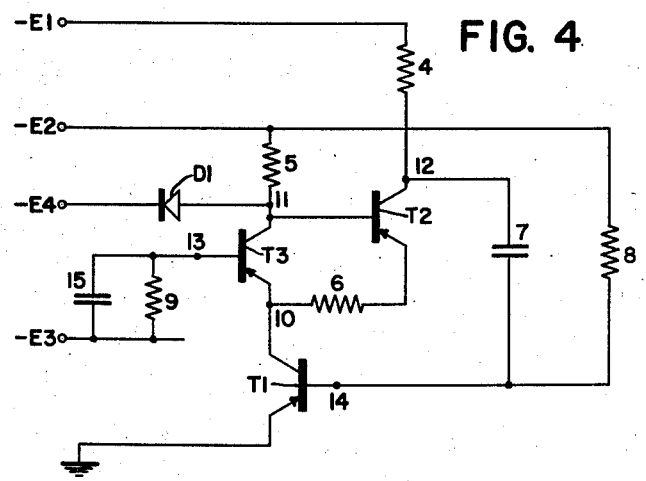
Figure 5:
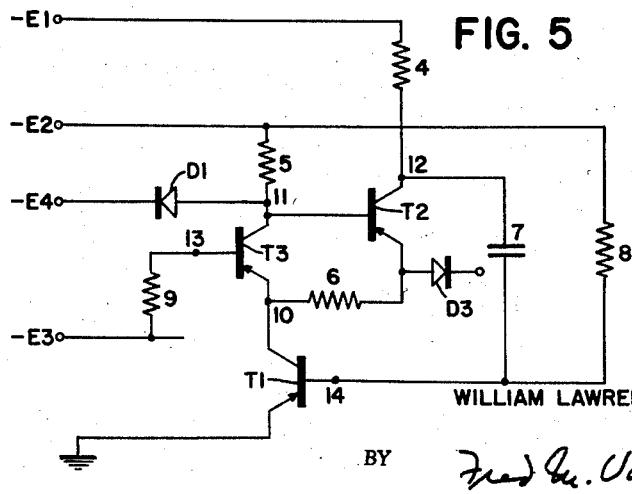

Figures 3, 4, and 5 are modifications of the embodiment of Figure 1.

Referring now to the drawing, the aforementioned first and second transistors are indicated as T1 and T2 and are PNP junction transistors provided with a collector voltage —E1 applied through a load 4.

The negative feedback loop includes a capacitor 7 which provides negative feedback from the collector of transistor T2 (or point 12) to the base of transistor T1 (or point 14).

The regenerative or positive feedback loop or trigger loop includes a direct coupling from the collector of transistor T3 (or point 11) to the base of transistor T2 and a coupling comprising a resistance 6 between the emitter of transistor T3 (or point 10) and the emitter of transistor T2.

The negative feedback loop includes in this case (in addition to capacitor 7) the emitter-collector path of transistor T2 and is interrupted by voltages applied to the base of transistor T2 which thus constitutes part of the positive feedback or trigger loop.

Due to the negative feed-back, the condenser 7 is discharged at a rate corresponding to an effective time constant of approximately $C_7 R_4 \alpha'_1$ and to an effective supply voltage of approximately $$\frac{E_2 \alpha'_1 R_4}{R_8}$$

where $\alpha'_1$ is the current amplification factor of the first transistor in grounded emitter connection. This discharging process is, however, interrupted at an early stage by bottoming of the transistor $T_1$ or by regenerative feedback action interruption of the collector circuit of the transistor $T_1$ and of the negative feed-back loop. The two states of the circuits are therefore a substantially linear change in output voltage controlled by negative feedback, followed by return or flyback to a stable condition under the influence of positive feedback.

Other components and potentials are introduced in the following description of the operation of the circuit in a triggered single sweep or monostable application.

In the rest condition, transistor T3 is fully conducting and transistor T2 is also fully conducting, while point 11 is held at a potential —E4 via a rectifier D1. Point 10 is at a potential between —E3 and ground determined by transistor T1 and resistor 8. Transistor T2 conducts a current controlled by potential —E4, resistor 6, and the potential at point 10. The value of load resistor 4 is chosen so that the potential at point 12 is greater than potential —E4.

On the application of a trigger pulse which may be positive-going if applied at any of points 12, 13 or 14, or negative-going at 10 or 11, the potential at 11 becomes approximately equal to —E2, the current in transistor T2 increases, and the positive-going potential at 12 is transmitted via capacitor 7 to transistor T1. This in turn reduces the collector current of transistor T1 thus causing the potential at point 10 to go more negative than —E3 and thereby placing transistor T3 in the cut off condition.

Thus transistor T3 is cut off while transistor T2 has its emitter held approximately at potential —E2.

The current through the chain 4—12—T2—6—10—T1 is controlled by the negative feedback action produced by way of capacitor 7 so that the potential at point 12 or 10 increases according to a positive-going, substantially linear curve.

This action is terminated by the potential at point 10 going positive with respect to —E3 so that transistor T3 is brought into conduction. This initiates a decrease in the collector current of transistor T2 so that the potential at 12 goes more negative thus driving transistor T1 (via capacitor 7) into full conduction. This enhances the regenerative switching of action of the loop T3—11—T2—6—10, so that there is a fast reversion to the initial condition of rest.

If the rectifier D1 connected to point 11 is removed, transistor T3 will be bottomed at rest, and transistor T2 will be cut off, otherwise the action is the same.

If a rectifier D2 is inserted between point 12 and a point at a potential —E0 intermediate between —E1 and —E2 as shown in Figure 3, the increase of potential at point 12 will be terminated by D2 coming into conduction provided that this occurs before point 10 reaches potential —E3.

If the value of resistor 8 is higher than a predetermined value, the circuit will be self-oscillating since transistor T1 cannot supply sufficient current to keep the regenerative circuit formed by transistors T2 and T3 in a stable condition.

The regenerative circuit formed by transistors T2 and T3 may be made monostable by shunting resistor 9 with a capacitor 15 as shown in Figure 4, in which case the increase of potential at point 12 may be permitted to occur only during a period determined by the values of resistor 9 and capacitor 15. A similar result is obtained if capacitor 15 is inserted between point 13 and ground or another point of constant potential, while resistor 9 is returned from point 13 to the emitter of transistor T2.

The emitter of transistor T2 may be taken to a point of constant potential via another rectifier D3, shown in Figure 5, which is arranged to act as a bottom catch and may be useful in circuits with or without the rectifier D2.

If resistor 6 is replaced by a direct connection, i.e. a connection presenting no or substantially no impedance, the circuit may be monostable or oscillatory. In either event it is desirable in this case to provide the rectifier D2 and remove the rectifier D1 since otherwise point 10 can no longer go positive with respect to —E3 as is required for transistor T3 to conduct.

What is claimed is:

1. A circuit arrangement comprising first, second and third transistors each having emitter, collector and base electrodes, a degenerative feedback loop comprising said second transistor and a capacitor connected in series circuit arrangement with the emitter-collector path of said second transistor between the base and collector electrodes of said first transistor, means for applying supply voltages to the base electrode of said first transistor and to the collector and base electrodes of said second and third transistors, and a regenerative feedback loop comprising means coupling said second and third transistors whereby said degenerative loop produces a substantially linearly increasing voltage from an initial condition and said regenerative loop substantially interrupts the collector current of said second transistor thereby interrupting the voltage produced by said degenerative loop and decreasing said last-mentioned voltage relatively rapidly to said initial condition.

2. A circuit arrangement comprising first, second and third transistors each having emitter, collector and base electrodes, a degenerative feedback loop comprising said second transistor and a capacitor connected in series circuit arrangement with the emitter-collector path of said second transistor between the base and collector electrodes of said first transistor, means for applying supply voltages to the base electrode of said first transistor and to the collector and base electrodes of said second and third transistors, and a regenerative feedback loop comprising means coupling the base electrode of said second transistor to the collector electrode of said third transistor and means coupling the emitter electrodes of said second and third transistors whereby said degenerative loop produces a substantially linearly increasing voltage from an initial condition and said regenerative loop substantially interrupts the collector current of said second transistor thereby interrupting the voltage produced by said degenerative loop and decreasing said last-mentioned voltage relatively rapidly to said initial condition.

3. A circuit arrangement comprising first, second and third transistors each having emitter, collector and base electrodes, a degenerative feedback loop comprising said second transistor and a capacitor connected in series circuit arrangement with the emitter-collector path of said second transistor between the base and collector electrodes of said first transistor, means for applying supply voltages to the base electrode of said first transistor and to the collector and base electrodes of said second and third transistors, and a regenerative feedback loop comprising means coupling the base electrode of said second transistor to the collector electrode of said third transistor and a common emitter connection coupling the emitter electrodes of said second and third transistors whereby said degenerative loop produces a substantially linearly increasing voltage from an initial condition and said regenerative loop substantially interrupts the collector current of said second transistor thereby interrupting the voltage produced by said degenerative loop and decreasing said last-mentioned voltage relatively rapidly to said initial condition, the collector electrode of said first transistor being connected to said common emitter connection.

4. A circuit arrangement comprising first, second and third transistors each having emitter, collector and base electrodes, said first and second transistors being junction type transistors of the same conductivity type, a degenerative feedback loop comprising said second transistor and a capacitor connected in series circuit arrangement with the emitter-collector path of said second transistor between the base and collector electrodes of said first transistor, means for applying supply voltages to the base electrode of said first transistor and to the collector and base electrodes of said second and third transistors, and a regenerative feedback loop comprising means coupling the base electrode of said second transistor to the collector electrode of said third transistor and means coupling the emitter electrodes of said second and third transistors whereby said degenerative loop produces a substantially linearly increasing voltage from an initial condition and said regenerative loop substantially interrupts the collector current of said second transistor thereby interrupting the voltage produced by said degenerative loop and decreasing said last-mentioned voltage relatively rapidly to said initial condition.

5. A circuit arrangement comprising first, second and third transistors each having emitter, collector and base electrodes, a degenerative feedback loop comprising said second transistor and a capacitor connected in series circuit arrangement with the emitter-collector path of said second transistor between the base and collector electrodes of said first transistor, means for applying supply voltages to the base electrode of said first transistor and the collector and base electrodes of said second and third transistors, and a regenerative feedback loop comprising means directly connecting the base electrode of said second transistor to the collector electrode of said third transistor and D.C. connecting means coupling the emitter electrodes of said second and third transistors whereby said degenerative loop produces a substantially linearly increasing voltage from an initial condition and said regenerative loop substantially interrupts the collector current of said second transistor thereby interrupting the voltage produced by said degenerative loop and decreasing said last-mentioned voltage relatively rapidly to said initial condition.

6. A circuit arrangement comprising first, second and third transistors each having emitter, collector and base electrodes, a degenerative feedback loop comprising a first capacitor, means coupling the collector electrode of said second transistor to the base electrode of said first transistor through said capacitor and means coupling the emitter electrode of said second transistor to the collector electrode of said first transistor, a second capacitor, a resistor, means for applying supply voltages to the base electrode of said first transistor and to the collector and base electrodes of said second and third transistors, said last-mentioned means including means connecting the base electrode of said third transistor to a point at constant potential through said second capacitor and means connecting the base electrode of said third transistor to a point at constant potential through said resistor, and a regenerative feedback loop comprising means directly connecting the base electrode of said second transistor to the collector electrode of said third transistor and D.C. connecting means coupling the emitter electrodes of said second and third transistors whereby said degenerative loop produces a substantially linearly increasing voltage from an initial condition and said regenerative loop substantially interrupts the collector current of said second transistor thereby interrupting the voltage produced by said degenerative loop and decreasing said last-mentioned voltage relatively rapidly to said initial condition.

7. A circuit arrangement comprising first, second and third transistors each having emitter, collector and base electrodes, a degenerative feedback loop comprising a capacitor, means coupling the collector electrode of said second transistor to the base electrode of said first transistor through said capacitor and means coupling the emitter electrode of said second transistor to the collector electrode of said first transistor, means for applying supply voltages to the base electrode of said first transistor and to the collector and base electrodes of said second and third transistors, a regenerative feedback loop comprising means coupling the base electrode of said second transistor to the collector electrode of said third transistor and means coupling the emitter electrodes of said second and third transistors whereby said degenerative loop produces a substantially linearly increasing voltage from an initial condition and said regenerative loop substantially interrupts the collector current of said second transistor thereby interrupting the voltage produced by said degenerative loop and decreasing said last-mentioned voltage relatively rapidly to said initial condition, and means for applying an input switching pulse to a selected one of the base electrodes of said first and third transistors and the collector electrode of said second transistor.

8. A circuit arrangement comprising first, second and third transistors each having emitter, collector and base electrodes, a degenerative feedback loop comprising a capacitor, means coupling the collector electrode of said second transistor to the base electrode of said first transistor through said capacitor and means coupling the emitter electrode of said second transistor to the collector electrode of said first transistor, means for applying supply voltages to the base electrode of said first transistor and to the collector and base electrodes of said second and third transistors, a regenerative feedback loop comprising means coupling the base electrode of said second transistor to the collector electrode of said third transistor and means coupling the emitter electrodes of said second and third transistors whereby said degenerative loop produces a substantially linearly increasing voltage from an initial condition and said regenerative loop substantially interrupts the collector current of said second transistor thereby interrupting the voltage produced by said degenerative loop and decreasing said last-mentioned voltage relatively rapidly to said initial condition, and means for applying an input switching pulse to the emitter electrode of said third transistor or the base electrode of said second transistor.

References Cited in the file of this patent

UNITED STATES PATENTS

| | | |
|---|---|---|
| 2,663,800 | Herzog | Dec. 22, 1953 |
| 2,764,643 | Sulzer | Sept. 25, 1956 |